3,290,216
PURIFICATION AND DE-PYROGENATION OF CHORIONIC GONADOTROPIN

Nazzareno Toccaceli and Enzo Salvioni, Milan, Italy, assignors to Ormonoterapia Richter S.p.A., Milan, Italy, a corporation of Italy
No Drawing. Filed Nov. 23, 1960, Ser. No. 71,139
Claims priority, application Italy, Aug. 8, 1960, 14,073/60
2 Claims. (Cl. 167—74)

This invention covers chorionic gonadotropin depyrogenation by means of a basic cellulose resin.

Many chorionic gonadotropin (C.G.) preparations commercially available present a titre ranging between 1,500,000 to 2,500,000 I.U./g., but they often have a high pyrogenic content. In addition to this, when dissolved they constantly result in a yellow-brown coloration, more or less apparent in intensity. C.G. solution filtration through de-pyrogenic filters does not always achieve the desired results; in fact, in most cases said filtration scarcely improves apyrogenic rate in C.G. preparations, especially when said rate is initially very low.

It has been observed now that percolation of C.G. preparations with high pyrogenic rates through a basic cellulose resin column results in products with very low pyrogenic content. In addition to this, the process allows to further increase titre in the initial product, with practically thorough decoloration.

Activity is thus recovered in the order of 75 to 90%, whilst the lowest values are found when the initial product has a titre much lower than 1,000,000 I.U./g. Also final product de-pyrogenation can depend upon the comparative purity in the initial product.

Among cellulose resins suitable for C.G. purification and de-pyrogenation according to the method of the present invention we may mention e.g. diethyl-aminoethylcellulose (DEAE-cellulose), ECTEOLA-cellulose; DEAE-cellulose has been prepared according to the method illustrated by Peterson and Sober (J. Am. Chem. Soc. 78,751—1956); ECTEOLA-cellulose has been synthetized according to the aforementioned method.

The whole invention process results in a very simple and considerably quick operation. Resin is firstly buffered at pH 6.0 by 0.1 M acetate buffer, in a buffering suspension corresponding in volume to 40 ml. buffer for 1 g. resin; pH increases to 9.0–9.3 and is reduced again down to pH=6 by addition of a little quantity of acetic acid.

After 30 minute storage the supernatant liquid is decanted and the resin filtered, washed twice in a similar manner in an equal volume of buffer, filtered again, brought to suspension in a few milliliters buffer and introduced into a column with a cooling sheathing, the section of which is such as to prevent the resin column from exceeding 10–11 cm. in height.

The column is washed with a little 0.1 M acetate buffer at pH=6, then the C.G. preparation is percolated in a solution with 0.1 M acetate buffer at pH=6, in 10 mg./ml. concentration, at a temperature of 0–4° C. obtained by means of cold water circulated through the cooling sheathing.

Colored parts and pyrogenic substances are captured by resin, whilst the active part is not resorbed and flows into the percolated fluid, where it can be precipitated by 5 volumes of acetone.

It is worthwhile to remark that a good de-pyrogenation can be achieved if the glass material to be used in the process has been previously de-pyrogenated by means of heat (250° C. for 4 hours). The quantity of resin to be used corresponds to 5–10 times the weight of the product to be de-pyrogenated; the weight ratio of the resin to chorionic gonadotropin to be treated is in the range of from 3:1 to 15:1. A larger quantity of resin is required when the products to be de-pyrogenated have a titre lower than 900,000 I.U./g.

Filtration of the percolated fluid through de-pyrogenating filters is a contribution to higher apyrogenic rates, especially in view of the fact that such filters remove those resin traces that are let in by the porous glass filter in the percolation column. On the contrary, the same de-pyrogenating filters yield no appreciable results when used before treatment with basic cellulose resin.

Used cellulose resin can be regenerated and used for a new charge; regeneration is obtained by alternatively washing resin with NaOH 1 N and HCl 1 N solutions; anyway, the final washing is required to be basic. Resin is then washed with water up to neutrality, then again with ethyl-alcohol, and finally dried in vacuum.

Depyrogenation of large C.G. lots makes it advisable for the product to undergo a first treatment with DEAE-cellulose, under shaking and using half the total resin lot. On a second time the other half of the resin lot is column-treated. This modification removes the inconveniences that can take place when too high resin columns are used and percolation turns too slow. Even the only process of resorption under shaking can be used, but in this case at least three resorption stages should be carried out, each time using a quantity of resin corresponding to 3–4 times the weight of the product for which de-pyrogenation is required.

Likewise, it has been observed that results are excellent if both the hormone and the impurities are firstly resorbed by resin buffered at pH=7 with a buffer having a very low ionic strength and the active moiety thus obtained—now purified and pyrogen-free—is eluted with acetate buffer at pH=6.0 (0.1 M in $CH_3 \cdot COONa$).

Pyrogenic rates in products before and after treatment have been determined in rabbits: to this purpose, scale quantities of the product were injected by intravenous route allowing for the weight of the animal; the injected doses were calculated on kilogram weight ratio.

The following examples illustrate the entire purification and de-pyrogenation process in details; anyway, the examples represent no limitation to the invention under discussion.

Example No. 1

2 g. C.G. (titre 1,000,000 I.U./g.) was dissolved in 200 cc. acetate buffer at pH=6.0 (0.1 M in $CH_3COONa$).

12 g. DEAE-cellulose was buffered at pH=6 in the course of three treatments, in each of which 400 ml. 0.1 M buffer at pH=6.0 was used. The pH grew to 9.3 after the first treatment and was adjusted again to 6.0 by addition of little quantities of acetic acid. After 30 minute storage the slightly opalescent supernatant was decanted, the resin filtered, brought to suspension in further 400 ml. buffer, filtered again and so on.

After the third treatment, the resin was suspended in about 200 ml. buffer and introduced into a column provided with cooling sheathing, 30 mm. in section. The layer resulted to be 85 mm. thick.

After buffer percolation, the hormonal solution was introduced and percolated at a speed of 2–4 ml./min. Formation of a colored ring was observed at once at the top of the column, whilst the percolate resulted to be almost quite colourless. The column was cooled by water circulating through the sheathing at 0–4° C.

After percolation the resin column was washed twice with 80 ml. 0.1 M buffer at pH=6.0 and the percolate was then treated with 5 volumes of acetone. After a nights' cold storage the precipitate was collected by centrifugation, washed with ethyl-alcohol, then with ethyl-ether and dried in vacuum.

Yield in weight: 800 mg.; titre: 2,200,000 I.U./g.
Activity recovered: 80%.

The not-treated product was injected to 3 rabbits at a dose of 20 I.U./kg., resulting in average thermic increase of 1.1° C. Likewise, the treated product was injected to 3 rabbits at a dose of 1,100 I.U./kg., with average temperature increase of 0.50° C.

*Example No. 2*

7.2 g. C.G. (titre 900,000 I.U./g.) was dissolved in 720 ml. acetate buffer at pH=6.0 (0.1 M in $CH_3COONa$) prepared with de-pyrogenated water.

50 g. resin was buffered separately at pH=6.0 by treatment with 2.0 l. buffer at pH=6.0 and filtered.

The resin was then suspended in about 400 ml. buffer and introduced into a 63 mm. $\phi$ column; the layer resulted to be about 90 mm. thick. After buffer percolation, the hormonal solution was introduced and percolated at a speed of 5-10 ml./min. at a cooling temperature of 0-4° C. After percolation the column was washed twice with 300 ml. buffer at pH=6.0, resulting in about 1,300 ml. percolate. The first half of the solution was directly precipitated with 5 volumes of acetone; after a night's cold storage the precipitate was collected by centrifugation, washed with ethyl-alcohol, then with ether and dried in vacuum.

Yield 710 mg.—titre: 4,000,000 I.U./g.
Activity recovered: 86%.

The not-treated product was injected to 3 rabbits at a dose of 20 I.U./kg., resulting in an average temperature increase of 1.2° C. Likewise, the final product was injected to 3 rabbits at a dose of 3,000 I.U./kg., with an average temperature increase of 0.43° C. Dosage of 5,000 I.U./kg. resulted instead in temperature increase of 0.85° C.

The other half of the total solution was filtered through a previously sterilized EKS filter and precipitated with 5 volumes of acetone; the precipitate was collected by centrifugation on the following day, washed with ethyl-alcohol, then with ethyl-ether and dried in vacuum.

Yield in weight: 530 mg.—titre: 5,000,000 I.U./g.
Activity recovered: 81%.

The product was injected to 3 rabbits at a dose of 5,000 I.U./kg., resulting in an average temperature increase of 0.40° C.

*Example No. 3*

7.5 g. C.G. (titre 750,000 I.U./g.) was suspended in 750 ml. acetate buffer at a pH=6.0 (0.1 M in $CH_3COONa$), prepared with pyrogen-free water. The insoluble and inactive fraction was removed by centrifugation.

65 g. DEAE-cellulose was separately buffered—as above illustrated—by three treatments (2.6 l. buffer at pH=6.0 each time) and introduced into a 66 mm. $\phi$ column, resulting in a resin column about 95 mm. high.

The strongly colored but clear hormonal solution was percolated through the column at a speed of 8-12 ml./min., resulting in an almost completely colorless percolate. The column was then washed twice with 400 ml. buffer each time and the total solution (approx. 1,600 ml.) was treated with 5 volumes of acetone to precipitate the purified hormone. After a night's cold storage the precipitate was collected by centrifugation, washed with ethyl-alcohol, then with sulfuric ether and dried in vacuum.

Yield in weight: 1.1 g.—titre: 3,750,000 I.U./g.
Activity recovered: 74%.

The not-treated product was injected to 3 rabbits at a dose of 10 I.U./kg., resulting in an average temperature increase of 1.2° C. Likewise, the final product was injected to 3 rabbits at a dose of 5,000 I.U./kg., with average temperature increase of 0.38° C.

*Example No. 4*

2.8 C.G. (titre 2,000,000 I.U./g.) was dissolved in 280 ml. acetate buffer at pH=6.0 (0.1 M in $CH_3COONa$), prepared with pyrogen-free water.

14 g. resin was buffered at pH=6.0 with 0.1 M acetate buffer—as previously specified—and introduced into a 32 mm. $\phi$ column, resulting in a resin column approx. 90 mm. high. The clear but colored hormonal solution was then percolated at a speed of 1.6-3.0 ml./min., resulting in an almost completely colorless percolate.

Two washings were carried out with 120 ml. buffer at pH=6.0 each time; the total solution was then treated with 5 volumes of acetone. The precipitate was collected by centrifugation on the following day, washed with ethyl-alcohol, then with sulfuric ether and finally dried in vacuum.

Yield in weight: 1.5 g.—titre: 3,000,000 I.U./g.
Activity recovered: 80%.

The initial drug was injected to 3 rabbits at a dose of 20 I.U./kg., resulting in an average increase of 0.90° C. Likewise, the final product was injected at a dose of 2,000 I.U./kg., with 0.3° C. temperature increase.

*Example No. 5*

12 g. C.G. (titre 1,000,000 I.U./g.) was dissolved in 1.2 l. 0.1 M acetate buffer at pH=6.0 prepared with pyrogenfree water.

60 g. resin was buffered at pH=6.0 with the aforementioned process and introduced into the clear but strongly colored hormonal solution, shaking at a cool temperature for 60 minutes, after which filtration through a Buchner funnel was carried out.

The darkened resin was washed with 300 ml. buffer and filtered. Washing waters were added to the main solution after filtration.

Further 60 g. resin was buffered in the meantime at pH=6.0 and introduced into a column with a cooling sheathing (68 mm. section; resin layer 8.2 cm. high).

The hormonal solution obtained from the first treatment was introduced into the resin column and percolated at a speed of 8-15 ml./min. After percolation, two washings were carried out with 400 ml. buffer each time, and the total solution thereby obtained (about 2,300 ml.) was treated with 5 volumes of acetone to obtain hormone precipitation.

After a 24 hour cool storage, the precipitate was collected by centrifugation, washed with ethyl-alcohol, then with sulfuric ether and finally dried in vacuum.

Yield in weight: 4.1 g.—titre: 2,700,000 I.U./g.
Activity recovered: 92%.

The initial drug was injected to 3 rabbits at a dose of 40 I.U./kg., resulting in an average temperature increase of 1.0° C. Likewise, the end product was injected at a dose of 2,000 I.U./kg., with an average temperature increase of 0.35° C.

*Example No. 6*

2 g. C.G. (titre 800,000 I.U./g.) was dissolved in 200 cc. phosphate buffer at pH=7.0 (0.005 M in $PO_4^{---}$).

10 g. DEAE cellulose was buffered at pH=7.0 with the same phosphate buffer and introduced into a column provided with a cooling sheathing (30 mm. $\phi$), resulting in a resin column about 70 mm. high.

After buffer percolation, the hormonal solution was introduced into the column and percolator, with outside cooling by means of water circulated at 0.4° C. A brownish ring appeared on the upper part of the resin, whilst the percolated fluid turned almost colorless and inactive. The column was washed twice with 50 cc. phosphate buffer at pH=7.0 (0.005 M in PO$_4$$^{---}$), then the active fraction was eluted with acetate buffer at pH=6.0 (0.1 M in CH$_3$COONa). The eluted fluid (320 ml.) was then treated with 8.5 M ethyl-alcohol to precipitate the purified hormone; after a night's cool storage the precipitate was collected by centrifugation, washed with ethyl-alcohol, then, with ethyl-ether and dried in vacuum.

The product contained small quantities of phosphate-free; which were removed by precipitation with Ca acetate at pH=8.5–9.0. The hormone was precipitated from the phosphateless solution again with 8.5 volumes of ethyl-alcohol and dried with the aforementioned process.

Yield in weight: 580 mg.—titration: 2,200,000 I.U./g. Activity recovered: 79%.

The initial drug was injected to 3 rabbits at a dose of 40 I.U./kg., resulting in an average temperature increase of 1.1° C. Likewise, the final product was injected at a dose of 1,000 I.U./kg., with 0.43° C. average temperature increase.

The invention under discussion is naturally not limited to the aforementioned examples, since it may undergo modifications and be within the limits of the spirit and scope of the following claims.

What is claimed is:

1. The method for the purification and depyrogenation of chorionic gonadotropin hormone which comprises percolating a sodium acetate solution of chorionic gonadotropin buffered to a pH to 6.0 through a suspension of a member selected from the group consisting of DEAE cellulose and ECTEOLA cellulose, wherein the weight ratio of said member to chorionic gonadotropin to be treated is in the range of from 3:1 to 15:1, in an aqueous solution of sodium acetate controlled and maintained at a pH of about 6.0, at a temperature in the range of from 0 to 4° C. for a period of time sufficient to remove pyrogens, separating a percolate therefrom and treating with a member of the group consisting of acetone and ethyl alcohol to precipitate a purified, depyrogenated chorionic gonadotropin.

2. The method for the purification and depyrogenation of chorionic gonadotropin hormone which comprises percolating a sodium phosphate solution of chorionic gonadotropin buffered to a pH of 7.0 through a suspension of a member selected from the group consisting of DEAE cellulose and ECTEOLA cellulose wherein the weight ratio of said member to chorionic gonadotropin to be treated is in the range of from 3:1 to 15:1, in an aqueous solution of sodium phosphate controlled and maintained at a pH of about 7.0 at a temperature in the range of from 0 to 4° C. for a period of time sufficient to remove pyrogens, separating a percolate therefrom and treating with a member of the group consisting of acetone and ethyl alcohol to precipitate a purified, depyrogenated chorionic gonadotropin.

References Cited by the Examiner

UNITED STATES PATENTS

| | | | |
|---|---|---|---|
| 2,375,979 | 5/1945 | Doisy et al. | 167—74.5 |
| 2,521,793 | 9/1950 | Howe et al. | 167—78 |
| 2,565,115 | 8/1951 | Bates et al. | 167—74.5 |
| 2,603,585 | 7/1952 | Claesson et al. | 167—74.5 X |
| 2,720,483 | 10/1955 | Stiller et al. | 167—74.5 |

OTHER REFERENCES

Bradbury et al.: P.S.E.B.M., vol. 71, June 1949, pp. 228–232.

Chemical Abstracts: vol. 52, listing 12969g, 1958 (citing Butt et al.), Journal of Edocrinology, vol. 17, pages 75–80, 1958.

Malburg et al.: J. Clin. Endocrine and Metabolism, vol. 14, June 1954, pp. 666–671.

McShan et al.: Proceedings of the Society for Experimental Biology and Medicine, vol. 88(1), pages 278–83, January 1955.

Peterson et al.: J.A.C.S., vol. 78, Feb. 20, 1956, pp. 751–763.

Steelman et al.: Endocrinology, vol. 59(2), pp. 256–7, August 1956.

LEWIS GOTTS, *Primary Examiner.*

W. B. KNIGHT, MORRIS O. WOLK, *Examiners.*

F. CACCIAPAGLIA, JR., R. HUFF, *Assistant Examiners.*